(12) United States Patent
Balogh et al.

(10) Patent No.: US 8,312,082 B2
(45) Date of Patent: *Nov. 13, 2012

(54) AUTOMATED SOCIAL NETWORKING BASED UPON MEETING INTRODUCTIONS

(75) Inventors: Eva Balogh, Szodliget (HU); David S. Braines, Winchester (GB); Enrique V. Kortright, Thibodaux, LA (US); James W. Ling, McKinney, TX (US); Andrew Strain, Warwickshire (GB); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/345,195

(22) Filed: Jan. 6, 2012

(65) Prior Publication Data

US 2012/0102119 A1    Apr. 26, 2012

Related U.S. Application Data

(63) Continuation of application No. 12/632,848, filed on Dec. 8, 2009, now Pat. No. 8,131,801.

(51) Int. Cl.
*G06F 15/16* (2006.01)
(52) U.S. Cl. ......... 709/204; 709/205; 709/206; 709/207
(58) Field of Classification Search .................. 709/204, 709/205, 206, 207; 705/1, 12, 9; 715/753, 715/723; 707/723
See application file for complete search history.

(56) References Cited

U.S. PATENT DOCUMENTS

| 5,559,875 | A | 9/1996 | Bieselin et al. |
| 5,710,591 | A | 1/1998 | Bruno et al. |
| 6,457,043 | B1 | 9/2002 | Kwak et al. |
| 6,687,671 | B2 | 2/2004 | Gudorf et al. |
| 6,826,159 | B1 | 11/2004 | Shaffer et al. |
| 2002/0116458 | A1* | 8/2002 | Bricklin et al. ............... 709/204 |
| 2003/0125954 | A1 | 7/2003 | Bradley et al. |
| 2005/0152523 | A1* | 7/2005 | Fellenstein et al. ...... 379/202.01 |
| 2007/0005691 | A1 | 1/2007 | Pushparaj |
| 2007/0112926 | A1 | 5/2007 | Brett et al. |
| 2007/0240060 | A1 | 10/2007 | Berenbach et al. |
| 2007/0260684 | A1 | 11/2007 | Sharma et al. |
| 2008/0120370 | A1 | 5/2008 | Chan et al. |
| 2008/0255847 | A1 | 10/2008 | Moriwaki et al. |
| 2009/0055238 | A1* | 2/2009 | Baryshnikov et al. ............ 705/8 |
| 2009/0099845 | A1 | 4/2009 | George |

(Continued)

OTHER PUBLICATIONS

United States Patent and Trademark Office, Office Action for U.S. Appl. No. 12/632,848, May 26, 2011, pp. 1-9, Alexandria, VA, USA.

(Continued)

*Primary Examiner* — Le H Luu
(74) *Attorney, Agent, or Firm* — Lee Law, PLLC; Christopher B. Lee

(57) ABSTRACT

A meeting record, including identified participant information associated with each of a group of meeting participants, and a topic for a meeting is generated using a social network computing device. A meeting participant link that accesses the social networking profile of a meeting participant is stored within the meeting record for each of the group of meeting participants that has authorized access by others to a social networking profile of the meeting participant. A meeting notification, including a link to the meeting record, is sent to each of the group of meeting participants.

17 Claims, 5 Drawing Sheets

U.S. PATENT DOCUMENTS

| | | |
|---|---|---|
| 2009/0119246 A1 | 5/2009 | Kansal |
| 2009/0210491 A1 | 8/2009 | Thakkar et al. |
| 2009/0234721 A1 | 9/2009 | Bigelow et al. |
| 2009/0235182 A1 | 9/2009 | Kagawa et al. |
| 2009/0248426 A1 | 10/2009 | Le |
| 2009/0307045 A1* | 12/2009 | Chakra et al. .................. 705/9 |
| 2009/0327425 A1 | 12/2009 | Gudipaty |
| 2010/0005142 A1 | 1/2010 | Xiao et al. |
| 2010/0235216 A1 | 9/2010 | Hehmeyer et al. |
| 2010/0268705 A1 | 10/2010 | Douglas et al. |
| 2011/0022967 A1* | 1/2011 | Vijayakumar et al. ........ 715/753 |

OTHER PUBLICATIONS

United States Patent and Trademark Office, Notice of Allowance for U.S. Appl. No. 12/632,848, Oct. 27, 2011, pp. 1-7, Alexandria, VA, USA.

* cited by examiner

300

US 8,312,082 B2

AUTOMATED SOCIAL NETWORKING BASED UPON MEETING INTRODUCTIONS

RELATED APPLICATIONS

This application is a continuation of and claims priority to and claims the benefit of U.S. patent application Ser. No. 12/632,848, now U.S. Pat. No. 8,131,801, titled "AUTOMATED SOCIAL NETWORKING BASED UPON MEETING INTRODUCTIONS," which was filed in the United States Patent and Trademark Office on Dec. 8, 2009, and which is incorporated herein by reference in its entirety.

BACKGROUND

The present invention relates to social networking. More particularly, the present invention relates to automated social networking based upon meeting introductions.

Social networking is generally accomplished by use of a web server that hosts a web site. Persons interested in social networking manually access the web site using a computing device and create profiles. The profiles may be searched via the web site to identify other persons with similar interests, occupations, or other similarities. Persons may initiate communication with other persons found to have, for example, similar interests or occupations.

BRIEF SUMMARY

A method includes generating, via a social network computing device, a meeting record comprising identified participant information associated with each of a plurality of meeting participants and a topic for a meeting; storing, for each of the plurality of meeting participants that has authorized access by others to a social networking profile of the meeting participant, a meeting participant link that accesses the social networking profile of the meeting participant within the meeting record; and sending a meeting notification to each of the plurality of meeting participants comprising a link to the meeting record.

A system includes a memory; and a processor programmed to: generate a meeting record comprising identified participant information associated with each of a plurality of meeting participants and a topic for a meeting; store, for each of the plurality of meeting participants that has authorized access by others to a social networking profile of the meeting participant, a meeting participant link that accesses the social networking profile of the meeting participant within the meeting record in the memory; and send a meeting notification to each of the plurality of meeting participants comprising a link to the meeting record.

A computer program product includes a computer readable storage medium having computer readable program code embodied therewith, the computer readable program code including computer readable program code configured to: generate a meeting record comprising identified participant information associated with each of a plurality of meeting participants and a topic for a meeting; store, for each of the plurality of meeting participants that has authorized access by others to a social networking profile of the meeting participant, a meeting participant link that accesses the social networking profile of the meeting participant within the meeting record; and send a meeting notification to each of the plurality of meeting participants comprising a link to the meeting record.

DETAILED DESCRIPTION

Figure 1:
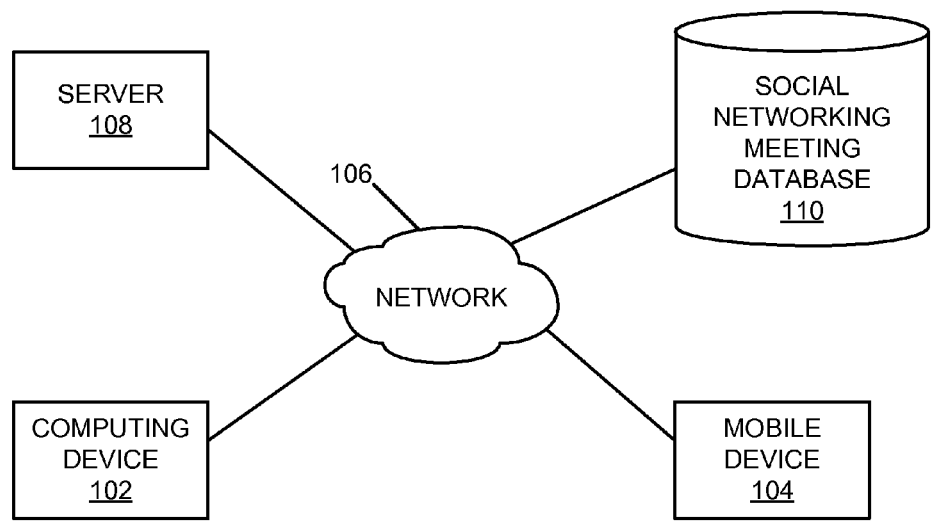
FIG. 1 is a block diagram of an example of an implementation of a system for automated social networking based upon meeting introductions according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated social networking based upon meeting introductions. A social network computing device captures introductory comments by each of multiple meeting participants at a meeting. Participant information associated with each meeting participant is identified within the introductory comments of each participant. A meeting record is generated including the identified participant information associated with each meeting participant and a topic for the meeting. The meeting record is stored and a meeting notification is sent to each meeting participant including a link to the stored meeting record. Meeting participants may access the meeting record using the link to network with other meeting participants.

In association with capturing the introductory comments of each meeting participant, each meeting participant may be prompted to speak a name, a purpose for attending the meeting, a skill set, interests, or to speak other information. Identifying the participant information associated with each meeting participant within the introductory comments of each participant may include performing speech recognition on the introductory comments of each meeting participant and generating a transcript of the introductory comments of each meeting participant based upon the speech recognition. The transcript may be parsed to identify phrases within the transcript. For example, a name, a purpose for attending the meeting, a skill set, interests, and the other information identified within the spoken and transcribed introductory comments may be associated with a meeting participant tag/record.

A search of previously-created and stored meeting participant records may be performed using the identified phrases, such as the identified name of each participant for example, to determine whether the respective meeting participant has an existing stored meeting participant record. A meeting participant record may be accessed or generated for each meeting participant in response to the determination of whether an existing record is found or not, respectively.

The accessed or created meeting participant record may be updated with the information identified within the transcript of the introductory comments and the meeting participant records may be stored. These meeting participant records may be associated with the generated meeting record by generating a tag for each meeting participant associated with at least one of the identified phrases in association with the meeting record. Storage of the meeting records, participant tags associated with meeting records, and the meeting participant records may be within a database, local memory, or other storage device appropriate for a given implementation.

The present subject matter further provides for searching stored meeting records for meetings that any of the meeting participants previously attended. Upon identification of at least one other stored meeting record representing another meeting that a meeting participant attended, a link between the respective meeting records may be created. Additionally, a determination may be made as to whether other stored meeting records include a topic related to the meeting topic for a created meeting record. In response to determining that other stored meeting records include a topic related to the meeting topic, a link may be created between the two meeting records. The created links between the respective meeting records may be associated with each identified meeting record to further integrate the information and social networking based upon meeting introductions of the present subject matter.

Meeting participants may traverse the created links using any of the associated meeting records to identify participants of meetings previously attended. For example, where a meeting participant remembers attending a meeting with a person having a particular domain expertise during a given month of a previous year, the meeting participant may traverse links for associated meeting records until a meeting record for the appropriate meeting is identified. The meeting participant may then traverse links for associated meeting participant records to identify the person with the particular domain expertise of interest. As such, the present subject matter further permits historical retrieval of contact information for newly-identified interests.

It is further noted that the information identified within the transcript of the introductory comments may further include identified information regarding social networking web sites. For example, a meeting participant may indicate, either in response to prompting or otherwise, that the meeting participant has an account or profile on one or more social networking web sites. The meeting participant may further indicate and it may be determined that the meeting participant has authorized other meeting participants to access the one or more of the social networking web site accounts or profiles. In response to determining that the meeting participant has authorized access to a social networking site where the meeting participant has a profile, a link may be automatically created to the profile and stored with the meeting record. Subsequently, meeting participants may navigate to the respective meeting participant's profile or account via the link associated with the meeting record.

It should be noted that the present subject matter is not limited to meetings where individuals gather around a particular conference table. The present subject matter also applies to web conference meetings, ad hoc meetings of individuals either at work or during recreation, and further may be utilized to generate meeting records for persons that are not presently acquainted. As an example of the latter possibility, the present subject matter may be implemented to receive, via a social network computing device, an indication that multiple mobile devices have each captured individual introductory comments for one person associated with the respective mobile devices. In response, a determination may be made as to whether common information exists within the captured individual introductory comments.

In response to determining that common information exists within the captured individual introductory comments, a meeting record including meeting participant records for the identified participant information associated with each person and associated meeting participant links may be generated and stored. A topic for the meeting may be generated, for example, including an aggregated meeting record with an identifier associated with each of the mobile devices. The link to the created meeting records, along with the topic, may be sent to the mobile devices to allow the users to determine whether to communicate with the other persons determined to have similar interests. As such, the present subject matter may further improve social networking opportunities based upon meeting introductions associated with devices, such as mobile devices, without persons having previously been acquainted.

Options to enable or disable the present functionality may be configured for each meeting participant to allow individuals to selectively participate in the automated social networking based upon meeting introductions. Further, configuration options may be provided to allow meeting participants to regulate and control distribution of their meeting participant links in association with created meeting records. As such, a request to block social networking access to the identified participant information associated with individual meeting participants may be detected. In response to detection of a request to block social networking access to identified participant information, social networking access to the identified participant information associated with the individual meeting participants may be blocked. Many other possibilities exist in association with the automated social networking based upon meeting introductions described herein and all are considered within the scope of the present subject matter.

The automated social networking based upon meeting introductions described herein may be performed in real time to allow prompt automated creation and updating of social networking profiles and interactive groups. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated social networking based upon meeting introductions. A computing device 102 operates as a social network computing device for purposes of the present subject matter. Meeting participants may gather in proximity to the computing device 102 during meetings, as described above and in more detail below. A mobile device 104 is also shown. As such, a person associated with the mobile device 104 may also participate in a meeting by use of the mobile device 104.

The computing device 102 and the mobile device 104 communicate via a network 106 with a server 108. The server 108 operates as a social networking server. The server 108 may host one or more social networking web sites.

The computing device 102 may create, store, and access meeting records and meeting participant records in a social networking meeting database 110. Either the server 108 or the computing device 102 may search stored records and follow links created between stored records as appropriate for a given implementation. The computing device 102 may further update stored meeting records and meeting participant records to increase associations between meetings and meeting participants over time, and to increase social networking opportunities for meeting participants.

As will be described in more detail below in association with FIG. 2 through FIG. 4B, the computing device 102 provides automated social networking based upon meeting introductions. The automated social networking based upon meeting introductions is based upon introductory information identified within verbal spoken introductions of meeting participants. The automated social networking based upon meeting introductions described herein improves meeting documentation for recording meeting participation in addition to improving social networking opportunities.

It should be noted that, in addition to the mobile device 104 representing a mobile computing platform, the computing device 102 may also be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
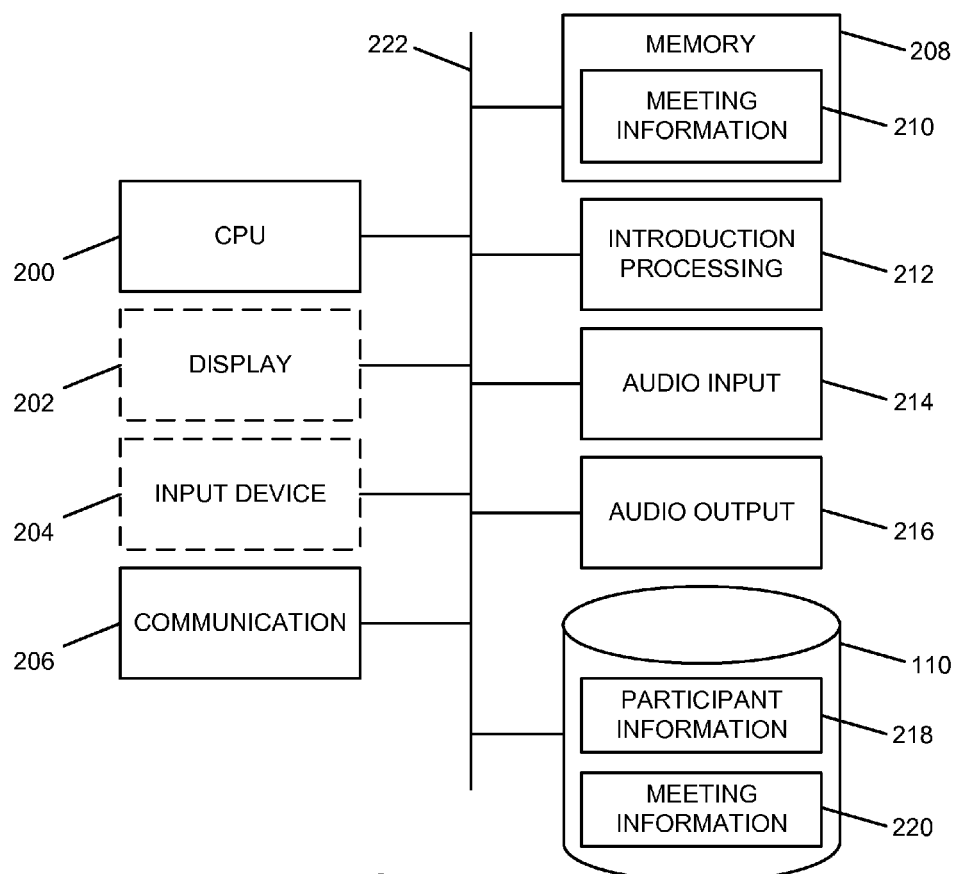
FIG. 2 is a block diagram of an example of an implementation of a computing device that is capable of performing automated social networking based upon meeting introductions according to an embodiment of the present subject matter.

FIG. 2 is a block diagram of an example of an implementation of the computing device 102 that is capable of performing automated social networking based upon meeting introductions. A central processing unit (CPU) 200 provides computer instruction execution, computation, and other capabilities within the computing device 102. A display 202 provides visual information to a user of the computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the computing device 102 for certain implementations. Accordingly, the computing device 102 may operate as a completely automated embedded device without user configurability or feedback. However, the computing device 102 may also provide user feedback and configurability via the display 202 and the input device 204, respectively.

A communication module 206 provides interconnection capabilities that allow the computing device 102 to communicate with other modules within the system 100, such as the mobile device 104 and the server 108, to perform the automated social networking based upon meeting introductions. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a meeting information storage area 210 that stores recorded audio meeting introductions, transcriptions of the recorded audio meeting introductions, and other information for the computing device 102. As will be described in more detail below, information stored within the meeting information storage area 210 is used to identify meeting participant information, to create meeting participant records, to create meeting records, and to perform other activities associated with the automated social networking based upon meeting introductions described herein.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

An introduction processing module 212 is also illustrated. The introduction processing module 212 provides introduction information and record creation, updating, and searching capabilities for the computing device 102, as described above and in more detail below. The introduction processing module 212 implements the automated social networking based upon meeting introductions of the computing device 102.

Though the introduction processing module 212 is illustrated as a component-level module for ease of illustration and description purposes, it should be noted that the introduction processing module 212 may include any hardware, programmed processor(s), and memory used to carry out the functions of this module as described above and in more detail below. For example, the introduction processing module 212 may include additional controller circuitry in the form of application specific integrated circuits (ASICs), processors, and/or discrete integrated circuits and components for performing communication and electrical control activities associated with the respective devices. Additionally, the introduction processing module 212 may also include interrupt-level, stack-level, and application-level modules as appropriate. Furthermore, the introduction processing module 212 may include any memory components used for storage, execution, and data processing for performing processing activities associated with the module.

It should also be noted that the introduction processing module 212 may form a portion of other circuitry described without departure from the scope of the present subject matter. Further, the introduction processing module 212 may alternatively be implemented as an application stored within the memory 208. In such an implementation, the introduction processing module 212 may include instructions executed by the CPU 200 for performing the functionality described herein. The CPU 200 may execute these instructions to provide the processing capabilities described above and in more detail below for the computing device 102. The introduction processing module 212 may form a portion of an interrupt service routine (ISR), a portion of an operating system, a portion of a browser application, or a portion of a separate application without departure from the scope of the present subject matter.

An audio input module 214 interfaces with an audio input device, such as a microphone (not shown), and captures audio introductions spoken by meeting participants. A audio output module 216 interfaces with an audio output device, such as a speaker (not shown), to provide audible output instructions to meeting participants to prompt the meeting participants to speak and provide the introductory information, such as the meeting participant's name, purpose for attending the meeting, skill set, interests, or to speak other information. It should be noted, however, that instructions for prompting the meeting participant to speak the requested introductory information may alternatively be displayed on the display 202 without departure from the scope of the present subject matter as appropriate for a given implementation.

The social networking meeting database 110 is shown in more detail within FIG. 2 and is shown associated with the computing device 102. As such, the social networking meeting database 110 may be operatively coupled to the computing device 102 as appropriate for a given implementation. As described above, the social networking meeting database 110 provides storage capabilities for information associated with the automated social networking based upon meeting introductions of the computing device 102. The social networking meeting database 110 includes a participant information storage area 218 and a meeting information storage area 220 that may be stored in the form of tables or other arrangements accessible by the computing device 102. The participant information storage area 218 includes records created for meeting participants, including information identifying the respective meeting participants, captured introductory information, links to attended meetings, links to social networking web sites, and other information as appropriate for a given implementation. The meeting information storage area 220 includes records for meetings, including links to other meeting records, meeting participant records, links associated with meeting records and/or meeting participants, and other information as appropriate for a given implementation.

The CPU 200, the display 202, the input device 204, the communication module 206, the memory 208, the introduction processing module 212, the audio input module 214, the audio output module 216, and the social networking meeting database 110 are interconnected via an interconnection 222. The interconnection 222 may include a system bus, a network, or any other interconnection capable of providing the respective components with suitable interconnection for the respective purpose.

While the computing device 102 is illustrated with and has certain components described, other modules and components may be associated with the computing device 102 without departure from the scope of the present subject matter. Additionally, it should be noted that, while the computing device 102 is described as a single device for ease of illustration purposes, the components within the computing device 102 may be co-located or distributed and interconnected via a network without departure from the scope of the present subject matter. For a distributed arrangement, the display 202, the input device 204, the audio input module 214, and/or the audio output module 216 may be located in a conference room, at a point of sale device, kiosk, or other location, while the CPU 200 and memory 208 may be located at a local or remote server. Many other possible arrangements for components of the computing device 102 are possible and all are considered within the scope of the present subject matter. It should also be understood that, though the participant information storage area 218 and the meeting information storage area 220 are shown within the social networking meeting database 110, they may also be stored within the memory 208 without departure from the scope of the present subject matter. Accordingly, the computing device 102 may take many forms and may be associated with many platforms.

Figure 3:
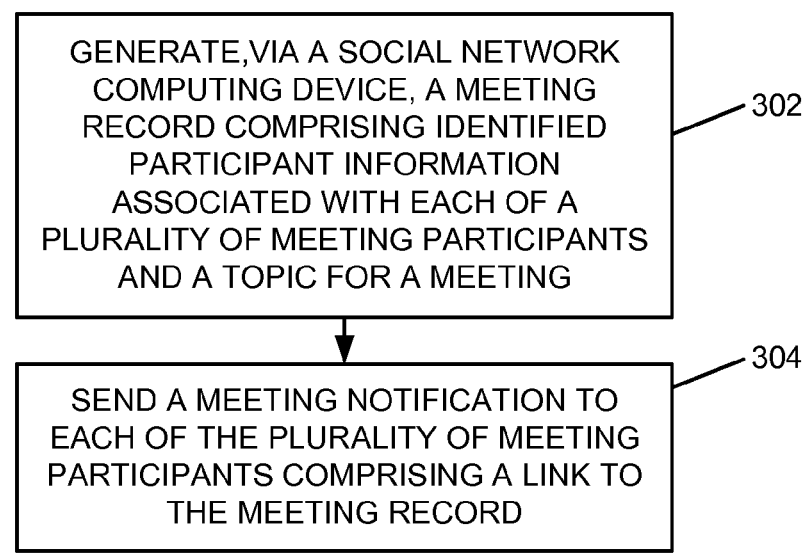
FIG. 3 is a flow chart of an example of an implementation of a process for automated social networking based upon meeting introductions according to an embodiment of the present subject matter.
Figure 4A:
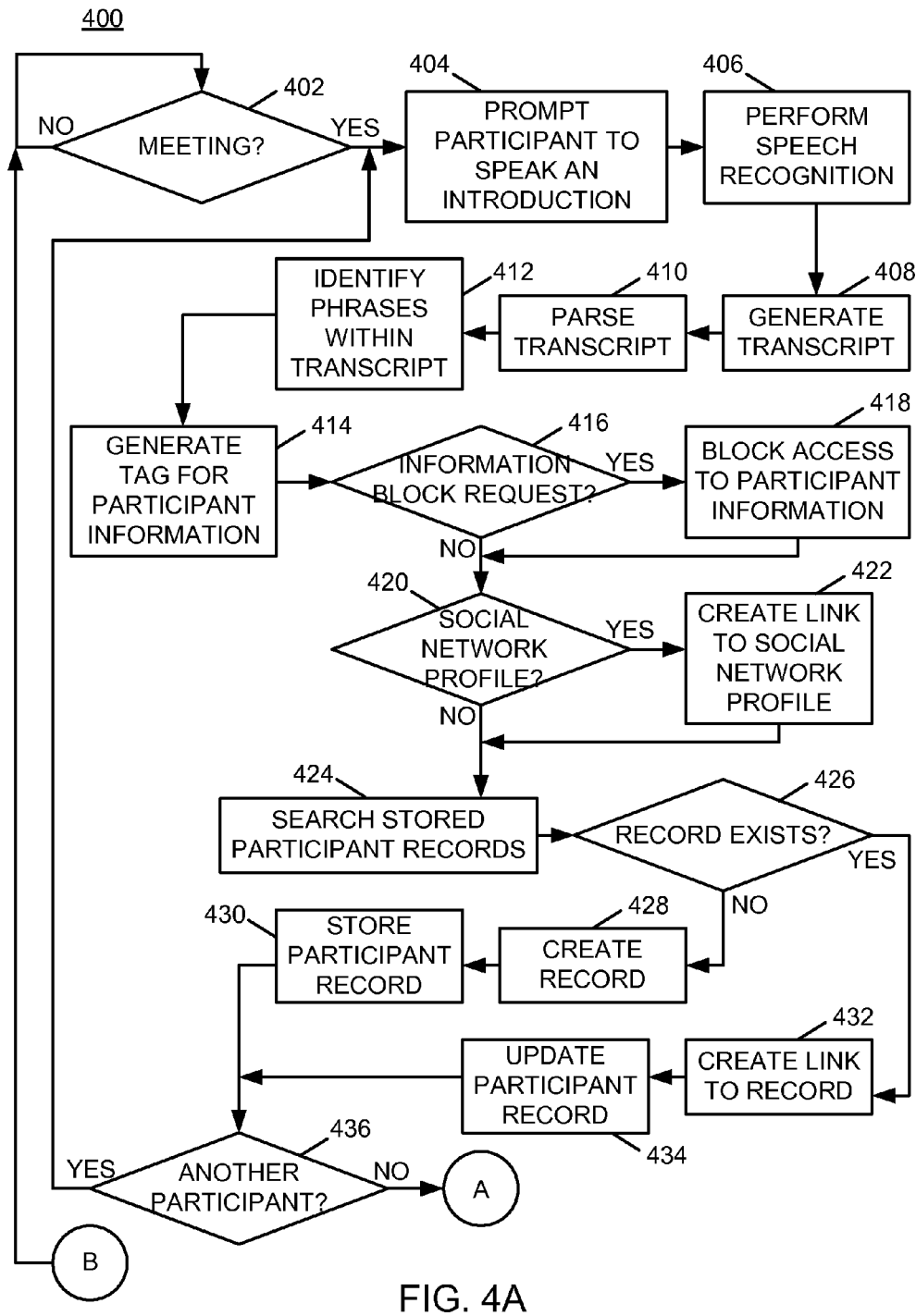
FIG. 4A is a flow chart of an example of an implementation of initial processing within a process for automated social networking based upon meeting introductions according to an embodiment of the present subject matter.
Figure 4B:
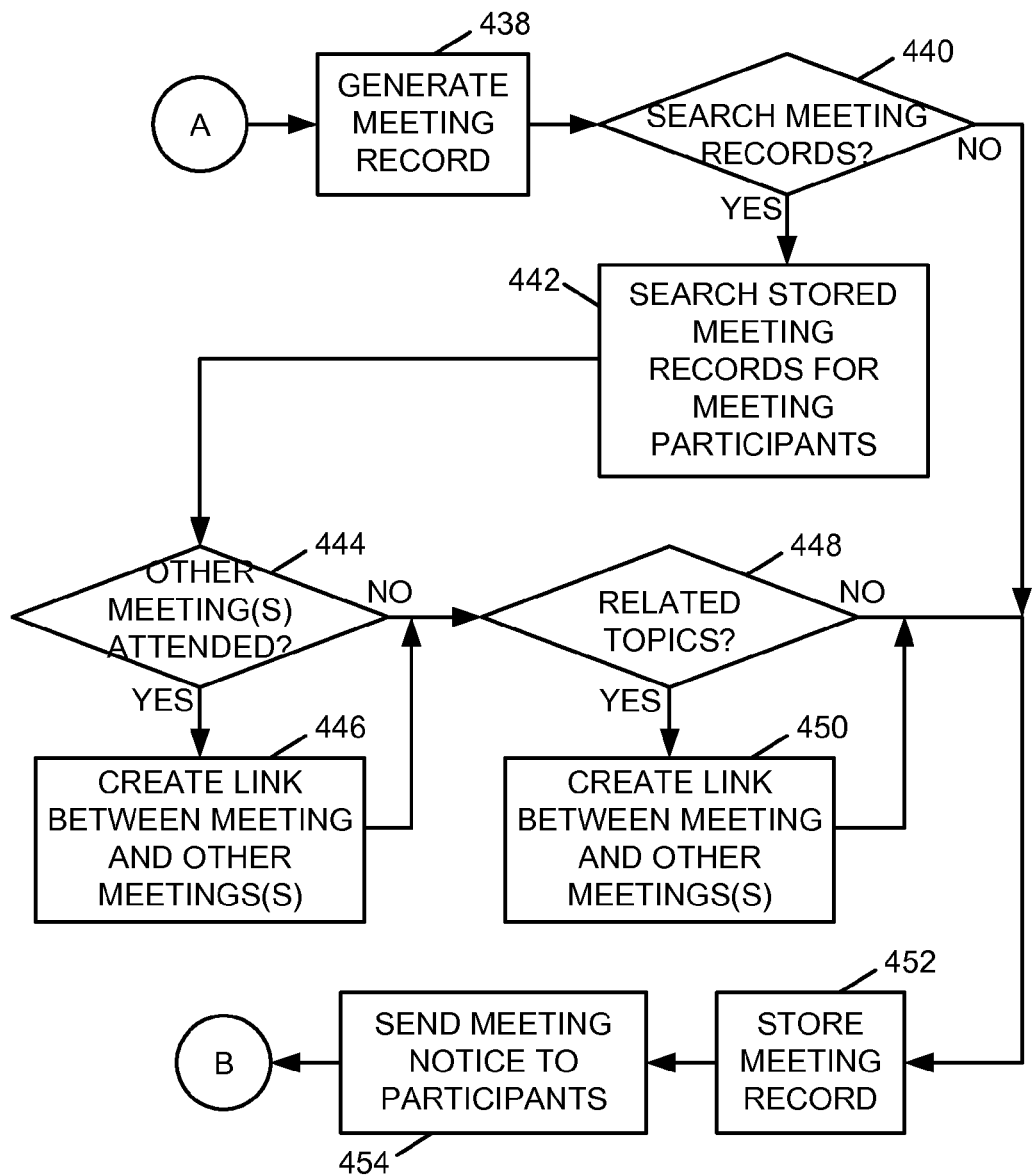
FIG. 4B is a flow chart of an example of an implementation of additional processing within a process for automated social networking based upon meeting introductions according to an embodiment of the present subject matter.

FIG. 3 through FIG. 4B below describe example processes that may be executed by devices, such as the computing device 102, to perform the automated social networking based upon meeting introductions associated with the present subject matter. Many other variations on the example processes are possible and all are considered within the scope of the present subject matter. The example processes may be performed by modules, such as the introduction processing module 212, and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated social networking based upon meeting introductions. At block 302, the process 300 generates, via a social network computing device, a meeting record comprising identified participant information associated with each of a plurality of meeting participants and a topic for a meeting. At block 304, the process 300 sends a meeting notification to each of the plurality of meeting participants comprising a link to the meeting record.

FIGS. 4A-4B illustrate a flow chart of an example of an implementation of a process 400 for automated social networking based upon meeting introductions according to the present subject matter. FIG. 4A illustrates initial processing within the process 400. At decision point 402, the process 400 makes a determination as to whether a meeting has been initiated. When a determination is made that a meeting has been initiated, the process 400 prompts a first participant to speak an introduction at block 404. For example, the process 400 may prompt a meeting participant to speak a name, a purpose for attending the meeting, a skill set, and/or an interest. At block 406, the process 400 performs speech recognition on the introductory comments of the meeting participant. At block 408, the process 400 generates a transcript of the introductory comments of the meeting participant based upon the speech recognition. At block 410, the process 400 parses the transcript. At block 412, the process 400 identifies phrases within the transcript. As discussed above, the phrases may include, for example, the name, the purpose for attending the meeting, the skill sets, and/or interests of the meeting participant. At block 414, the process 400 generates a tag for the meeting participant associated with the participant information identified within the phrases.

At decision point 416, the process 400 makes a determination as to whether an information block request has been detected. An information block request allows meeting participants to request that their information regarding meeting participation be blocked from distribution. An information block request may be entered by the meeting participant, such as via the input device 204, or spoken during the introductory comments to request a block of social networking access to the identified meeting participant information. When a determination is made that an information block request has been detected, the process 400 blocks access to the participant information at block 418.

When a determination is made at decision point 416 that an information block request has not been detected, or upon blocking access to the participant information at block 418, the process 400 makes a determination at decision point 420 as to whether a social network profile is associated with the meeting participant and whether the meeting participant has authorized access to a social networking site where the meeting participant has a profile. In response to determining that the meeting participant has a social networking profile and has authorized access to the profile by other meeting participants, the process 400 automatically creates a link to the social networking profile at block 422. The created link to the social networking profile may be stored in association with other information described herein.

When a determination is made at decision point 420 that a social networking profile does not exist or that the meeting participant has not authorized access to the social networking profile by meeting participants, or upon creating the link the social networking profile at block 422, the process 400 searches stored meeting participant records to attempt to identify a meeting participant record associated with the identified meeting participant at block 424. At decision point 426, the process 400 makes a determination as to whether the meeting participant has an existing stored meeting participant record.

When a determination is made at decision point 426 that the meeting participant does not have an existing stored meeting participant record, the process 400 creates a meeting participant record at block 428. At block 430, the process 400 stores the meeting participant record, including information derived from and including the identified phrases from the spoken introduction. The process 400 may also generate a tag for the meeting participant associated with the identified phrase or phrases and may store any generated tags with the identified participant information.

When a determination is made at decision point 426 that the meeting participant has an existing stored meeting participant record, the process 400 creates a link to the existing meeting participant record at block 432. At block 434, the process 400 updates the existing meeting participant record with the identified meeting participant information.

Regarding either created meeting participant records or updated meeting participant records, it is understood that the process 400 may further create a link to a meeting record associated with the present meeting. However, for ease of description purposes, meeting record processing is described in more detail in association with FIG. 4B below.

After storing a created meeting participant record at block 430 or after updating an existing meeting participant record at block 434, the process 400 makes a determination at decision point 436 as to whether another meeting participant is associated with the present meeting. When a determination is made that another meeting participant is associated with the present meeting, the process 400 returns to block 404 and iterates as described above for each meeting participant.

When a determination is made at decision point 436 that introductions have been processed for all meeting participants, the process 400 transitions to the processing shown and described in association with FIG. 4B.

FIG. 4B illustrates additional processing associated with the process 400 for automated social networking based upon meeting introductions. At block 438, the process 400 generates a meeting record, including the identified meeting participant information associated with each meeting participant, and a topic for the meeting. The process 400 further includes links to each created or existing meeting participant record and associates those links with the generated meeting record. At decision point 440, the process 400 makes a determination as to whether to search stored meeting records for other meetings that the meeting participants have attended or for meetings with related topics. When a determination is made to search stored meeting records for other meetings that the meeting participants have attended or for meetings with related topics, the process 400 searches the stored meeting records for meeting participants associated with the present meeting at block 442. At decision point 444, the process 400 makes a determination as to whether any other meeting or meetings have been attended by participants of the present meeting. When a determination is made at decision point 444 that at least one other meeting has been attended by at least one participant of the present meeting, the process 400 creates a link between the generated meeting record and any other identified meeting records at block 446.

When a determination is made at decision point 444 that no other meetings have been attended by participants of the present meeting, or upon creating links between the generated meeting record and any identified meetings records at block 446, the process 400 makes a determination at decision point 448 as to whether any stored meeting record includes a topic related to the meeting topic for the present meeting. When a determination is made at decision point 448 that at least one other meeting includes a related meeting topic, the process 400 creates a link between the generated meeting record and any other meeting records for meetings identified as having a similar topic at block 450.

Returning to the description at decision point 440, when a determination is made not to search existing meeting records, or when a determination is made at decision point 448 that no meeting records exist with related topics, or upon creation of links between the generated meeting record and any other meetings records for meetings with related topics at block 450, the process 400 stores the meeting record at block 452. At block 454, the process 400 sends a meeting notice to each of the meeting participants. The meeting notice may include a link to the stored meeting record for the present meeting. By accessing the link to the stored meeting record, the meeting participant may access stored meeting participant records for each of the meeting participants in addition to any other links associated with the present meeting or any other related meetings as described above. The process 400 then returns to the processing described above in association with FIG. 4A at decision point 402 to await a new meeting.

As such, the process 400 captures introductory comments by each meeting participant at a meeting. The process 400 identifies meeting participant information associated with each meeting participant within the introductory comments and generates a meeting record including the identified meeting participant information and at least a meeting topic for the meeting. The process 400 searches for existing meeting participant records, either creates or updates existing meeting participant records as appropriate with the identified meeting participant information, and searches for other related meetings. Links to any related records, such as meeting participant records and other meeting records are created and the process 400 sends a notice to each meeting participant including a link to the meeting record. In this manner, the process 400 provides automated social networking based upon meeting introductions, improves meeting record keeping, and facilitates improved communications between meeting participants.

As described above in association with FIG. 1 through FIG. 4B, the example systems and processes provide automated social networking based upon meeting introductions. Many other variations and additional activities associated with automated social networking based upon meeting introductions are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
generating, via a social network computing device, a meeting record comprising identified participant information associated with each of a plurality of meeting participants and a topic for a meeting;
storing, for each of the plurality of meeting participants that has authorized access by others to a social networking profile of the meeting participant, a meeting participant link that accesses the social networking profile of the meeting participant within the meeting record;
sending a meeting notification to each of the plurality of meeting participants comprising a link to the meeting record;
determining, for each meeting participant, whether the meeting participant has authorized access by others to the social networking profile of the meeting participant within the identified participant information; and
generating, for each meeting participant determined to have authorized access by others to the social networking profile of the meeting participant, the meeting participant link that accesses the social networking profile of the meeting participant within the meeting record.

2. The method of claim 1, where storing, for each of the plurality of meeting participants that has authorized access by others to the social networking profile of the meeting participant, the meeting participant link that accesses the social networking profile of the meeting participant within the meeting record comprises:
determining, for each meeting participant, whether the meeting participant has authorized access by others to the social networking profile of the meeting participant via a configuration option that allows the meeting participant to selectively regulate and control distribution of meeting participant links that access the social networking profile of the meeting participant; and
generating, for each meeting participant determined to have the configuration option enabled, the meeting participant link that accesses the social networking profile of the meeting participant within the meeting record.

3. The method of claim 1, further comprising:
determining, for each of the plurality of meeting participants, whether the meeting participant has requested to block social networking access by others to the identified participant information associated with the meeting participant; and
blocking social networking access to the identified participant information associated with the each of the plurality of meeting participants that has requested to block social networking access to the identified participant information associated with the meeting participant.

4. The method of claim 1, further comprising identifying the participant information associated with each of the plurality of meeting participants within introductory comments spoken by each meeting participant.

5. The method of claim 4, further comprising:
determining whether common information exists within the introductory comments of at least two of the plurality of meeting participants; and
where generating, via the social network computing device, the meeting record comprising the identified participant information associated with each of the plurality of meeting participants and the topic for the meeting comprises generating the topic using the determined common information.

6. The method of claim 1, further comprising:
receiving, from a plurality of mobile devices at the social network computing device, an indication that the plurality of mobile devices have each captured individual introductory comments from at least one person associated with the respective mobile devices; and
where generating, via the social network computing device, the meeting record comprising the identified participant information associated with each of the plurality of meeting participants and the topic for the meeting comprises generating the topic with an aggregated element comprising an identifier associated with each of the mobile devices.

7. The method of claim 6, where sending the meeting notification to each of the plurality of meeting participants comprising the link to the meeting record comprises sending the link to the meeting record and the topic to each of the mobile devices.

8. A system, comprising:
a memory; and
a processor programmed to:
generate a meeting record within the memory comprising identified participant information associated with each of a plurality of meeting participants and a topic for a meeting;
store, for each of the plurality of meeting participants that has authorized access by others to a social networking profile of the meeting participant, a meeting participant link that accesses the social networking profile of the meeting participant within the meeting record;
send a meeting notification to each of the plurality of meeting participants comprising a link to the meeting record;
determine, for each meeting participant, whether the meeting participant has authorized access by others to the social networking profile of the meeting participant within the identified participant information; and
generate, for each meeting participant determined to have authorized access by others to the social networking profile of the meeting participant, the meeting participant link that accesses the social networking profile of the meeting participant within the meeting record.

9. The system of claim 8, where in being programmed to store, for each of the plurality of meeting participants that has authorized access by others to a social networking profile of the meeting participant, a meeting participant link that accesses the social networking profile of the meeting participant within the meeting record, the processor is programmed to:
determine, for each meeting participant, whether the meeting participant has authorized access by others to the social networking profile of the meeting participant via a configuration option that allows the meeting participant to selectively regulate and control distribution of meeting participant links that access the social networking profile of the meeting participant; and
generate, for each meeting participant determined to have the configuration option enabled, the meeting participant link that accesses the social networking profile of the meeting participant within the meeting record.

10. The system of claim 8, where the processor is further programmed to:
determine, for each of the plurality of meeting participants, whether the meeting participant has requested to block social networking access by others to the identified participant information associated with the meeting participant; and
block social networking access to the identified participant information associated with the each of the plurality of meeting participants that has requested to block social networking access to the identified participant information associated with the meeting participant.

11. The system of claim 8, where the processor is further programmed to:
identify the participant information associated with each of the plurality of meeting participants within introductory comments spoken by each meeting participant;
determine whether common information exists within the introductory comments of at least two of the plurality of meeting participants; and
where, in being programmed to generate the meeting record within the memory comprising the identified participant information associated with each of the plurality of meeting participants and the topic for the meeting, the processor is programmed to generate the topic using the determined common information.

12. The system of claim 8, where the processor is further programmed to:
receive, from a plurality of mobile devices at the social network computing device, an indication that the plurality of mobile devices have each captured individual introductory comments from at least one person associated with the respective mobile devices; and
where, in being programmed to:
generate the meeting record within the memory comprising identified participant information associated with each of the plurality of meeting participants and the topic for the meeting, the processor is programmed to generate the topic with an aggregated element comprising an identifier associated with each of the mobile devices; and
send a meeting notification to each of the plurality of meeting participants comprising a link to the meeting record, the processor is programmed to send the link to the meeting record and the topic to each of the mobile devices.

13. A computer program product comprising a computer readable storage medium including computer readable program code, where the computer readable program code when executed on a computer causes the computer to:
generate a meeting record within a memory comprising identified participant information associated with each of a plurality of meeting participants and a topic for a meeting;
store, for each of the plurality of meeting participants that has authorized access by others to a social networking profile of the meeting participant, a meeting participant link that accesses the social networking profile of the meeting participant within the meeting record;
send a meeting notification to each of the plurality of meeting participants comprising a link to the meeting record;
determine, for each meeting participant, whether the meeting participant has authorized access by others to the social networking profile of the meeting participant within the identified participant information; and
generate, for each meeting participant determined to have authorized access by others to the social networking profile of the meeting participant, the meeting participant link that accesses the social networking profile of the meeting participant within the meeting record.

14. The computer program product of claim 13, where in causing the computer to store, for each of the plurality of meeting participants that has authorized access by others to a social networking profile of the meeting participant, a meeting participant link that accesses the social networking profile of the meeting participant within the meeting record, the computer readable program code when executed on the computer causes the computer to:
- determine, for each meeting participant, whether the meeting participant has authorized access by others to the social networking profile of the meeting participant via a configuration option that allows the meeting participant to selectively regulate and control distribution of meeting participant links that access the social networking profile of the meeting participant; and
- generate, for each meeting participant determined to have the configuration option enabled, the meeting participant link that accesses the social networking profile of the meeting participant within the meeting record.

15. The computer program product of claim 13, where the computer readable program code when executed on the computer further causes the computer to:
- determine, for each of the plurality of meeting participants, whether the meeting participant has requested to block social networking access by others to the identified participant information associated with the meeting participant; and
- block social networking access to the identified participant information associated with the each of the plurality of meeting participants that has requested to block social networking access to the identified participant information associated with the meeting participant.

16. The computer program product of claim 13, where the computer readable program code when executed on the computer further causes the computer to:
- identify the participant information associated with each of the plurality of meeting participants within introductory comments spoken by each meeting participant;
- determine whether common information exists within the introductory comments of at least two of the plurality of meeting participants; and
- where, in causing the computer to generate the meeting record within the memory comprising the identified participant information associated with each of the plurality of meeting participants and the topic for the meeting, the computer readable program code when executed on the computer causes the computer to generate the topic using the determined common information.

17. The computer program product of claim 13, where the computer readable program code when executed on the computer further causes the computer to:
- receive, from a plurality of mobile devices at the social network computing device, an indication that the plurality of mobile devices have each captured individual introductory comments from at least one person associated with the respective mobile devices; and
- where, in causing the computer to:
  - generate the meeting record within the memory comprising identified participant information associated with each of the plurality of meeting participants and the topic for the meeting, the computer readable program code when executed on the computer causes the computer to generate the topic with an aggregated element comprising an identifier associated with each of the mobile devices; and
  - send a meeting notification to each of the plurality of meeting participants comprising a link to the meeting record, the computer readable program code when executed on the computer causes the computer to send the link to the meeting record and the topic to each of the mobile devices.

* * * * *